No. 675,027. Patented May 28, 1901.
W. W. TICE.
CONTROLLER FOR ELECTRIC CARS.
(Application filed Aug. 1, 1900.)
(No Model.)

WITNESSES:
Henry Krug
Russell M. Everett

INVENTOR:
Walter W. Tice,
BY
Drake & Co.
ATTORNEYS

UNITED STATES PATENT OFFICE.

WALTER W. TICE, OF RAHWAY, NEW JERSEY, ASSIGNOR OF ONE-HALF TO GEORGE H. TICE, OF PERTH AMBOY, NEW JERSEY.

CONTROLLER FOR ELECTRIC CARS.

SPECIFICATION forming part of Letters Patent No. 675,027, dated May 28, 1901.

Application filed August 1, 1900. Serial No. 25,506. (No model.)

*To all whom it may concern:*

Be it known that I, WALTER W. TICE, a citizen of the United States, residing at Rahway, in the county of Union and State of New Jersey, have invented certain new and useful Improvements in Controllers for Electric Cars; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to economize power in connection with the operation of trolley-cars, to avoid accidents due to inattention of the motorman to matters away from the car because of the close attention heretofore required by the independent brake and controller, to prevent interference of the brake with the motor and the loss of power due to the brake being applied to the wheel while electrical power is being still supplied to the motor, and to enable both the brake and the electrical controller to be operated by a single handle so arranged, in connection with the brake and electrical controller, that the brake can be applied to the wheel of the car and the controller be operated to cut off electrical power, and to secure other advantages and results, some of which may be referred to hereinafter in connection with the description of the working parts.

The invention consists in the improved brake and electrical-controller operating device and in the arrangements and combinations of parts of the same, all substantially as will be hereinafter set forth and finally embraced in the clauses of the claim.

Figure 1:
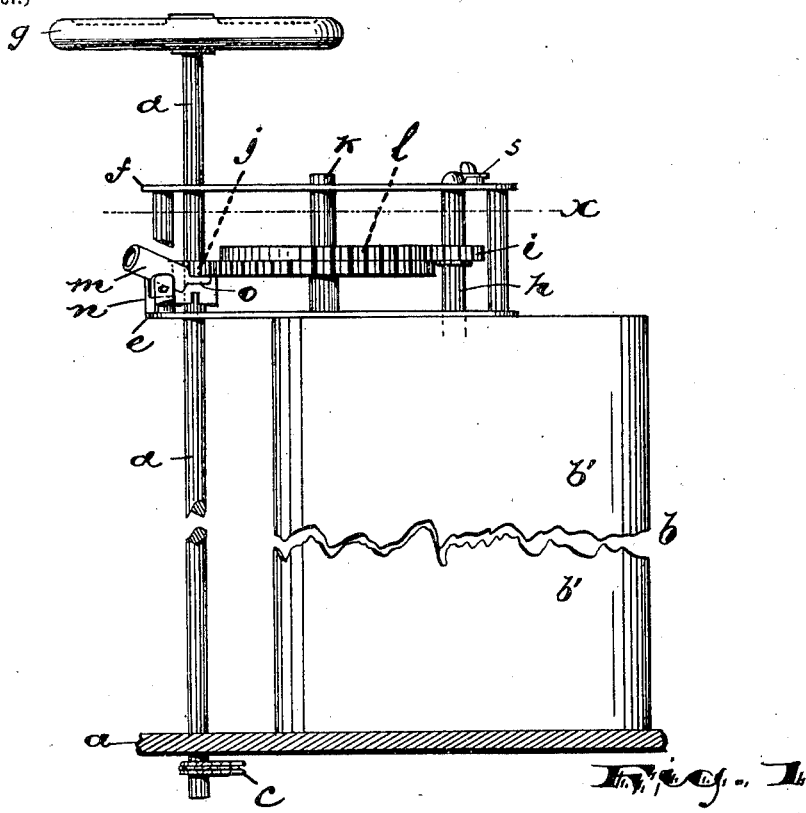
Figure 2:
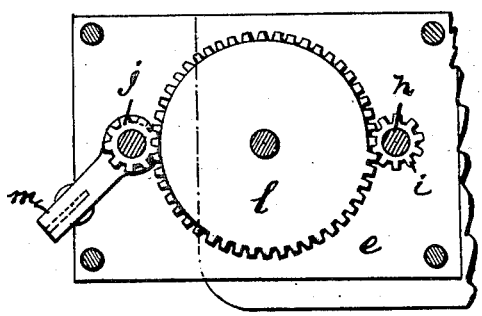
Figure 3:
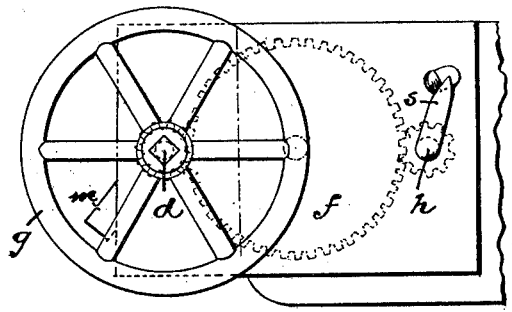

Referring to the accompanying drawings, in which like letters of reference indicate corresponding parts in each of the several views, Figure 1 is an elevation of a portion of a car-platform having my improved means for operating the brake and electrical controller. Fig. 2 is a section of the same, taken at line $x$, Fig. 1; and Fig. 3 is a plan of the device.

In said drawings, $a$ indicates the platform of a car, which may be of any ordinary construction and arrangement. $b$ is a suitable electrical controller, also of any usual type or construction, adapted to regulate and control the application of electric power to the motor of the car. $c$ indicates an ordinary brake chain or connection of any usual arrangement adapted to operate the brake-shoes (not shown) in connection with the levers or other appliances for transmitting the braking power to said brake-shoes.

$d$ represents a vertical shaft or rod having bearings upon the platform and upon the plates $e f$, suitably supported on said platform. To the upper end of the shaft or rod is arranged or applied a handle $g$, by means of which the said shaft or rod $g$ is turned by the motorman for the purpose of winding the brake-chain $c$ and applying braking power to the car-wheels.

$h$ indicates the usual controller-shaft, adapted to enter the casing $b'$ of the controller and operate the controlling mechanism within said casing in any usual manner, the said controller-shaft $h$ being provided with a cog-wheel $i$, by means of which power is transmitted thereto by means of a train of cog-gearing from the shaft $d$, the said shaft $d$ being also provided with a cog or pinion $j$. Intermediate of the said cogs $i j$ is arranged upon a suitable stud or arbor $k$, between the plates $e f$, a large gear-wheel $l$, with missing teeth and with cogs or teeth adapted to intermesh with the cogs of the pinions. The peripheral part of the intermediate cog-wheel $l$ at the upper edge for about one-third its circumference is provided with teeth to engage the pinion $i$, the teeth for the remainder of the circumference being missing at said upper edge, the said wheel being only supplied with enough teeth to effect only a single rotation of the pinion $i$ and shaft $h$ or to effect a change in the transmission of power. The engaging teeth for the pinion $i$ are so disposed and related to the pinions $i j$ and connections as to effect a movement of the cog $i$ and controller only when the brake-shoes are released from the car-wheels.

By the construction thus described in operating the parts to effect a stopping of the moving car the handle $g$ is turned, and with it the cog $j$, which is in engagement with the continuously circumferential teeth at or near the lower edge of the wheel l. At this time the pinion i is in engagement with the initial teeth of the short series near the top of the wheel l and the chain c is full or slack, so that the turning of the rod d and pinion j does not affect the brake immediately, but turns the cog-wheel l, pinion i, and controller-shaft h and its connections to close off power, the index or pointer s, in connection with the shaft h, being also turned, so that the motorman can know the amount of power being applied. When the power is about turned off, the slack or fullness in the chain c will have been taken up, and a further turning of the handle g operates the brake, and so the brake cannot be turned while the electrical power is still applied. Should the controller-shaft h or its connections catch within the controller-case b', as sometimes happens, and should it become necessary or desirable to apply the brakes while the electrical power is still "on," I prefer to arrange the pinion j so that it can be slid on the shaft d out of meshing engagement with the wheel l, so that the said shaft d may be turned independent of the electrical controller to wind up the brake-chain c. I have provided a short lever m, fulcrumed at n upon the plate e or a stud attached thereto. At one end the said lever m is forked or provided with fingers o, adapted to rest beneath the cog j, and at the opposite end the said lever m is provided or may be provided with a socket or means to receive a removable handle, and thus should it become necessary or desirable to disengage the pinion j from the pinion l the motorman can quickly apply the handle (not shown) to the lever m and by simple pressure force the pinion j out of meshing engagement, as will be understood.

I am aware that various changes may be made in the construction of the device from what is described above in positive terms without departing from the spirit or scope of the invention, and I do not wish to be understood as limiting myself to the exact construction shown in the drawings as above described, excepting as the state of the art may require.

Having thus described the invention, what I claim as new is—

1. The improved brake and electrical controller for electric cars, in which are combined the controller b, brake connection c, shaft or rod d, and a train of cogged gearing connecting the shaft d, and controller including pinions i and j, and a rotary cog-wheel l, having a continuous series of cogs to engage one of said pinions and a discontinuous series to engage the other of said pinions, substantially as set forth.

2. The combination with the electrical controller and brake-shaft d, and its connections, of a train of cog-wheels connecting the said shaft d, and electrical controller, the pinion on the shaft d, sliding to and from meshing relation to its coöperating wheel of the train and a lever for throwing said sliding pinion on said shaft, the said parts being arranged and constructed to effect a turning of the controller-shaft when the braking power is released from the brake-shoe, substantially as set forth.

3. The combination of the electrical controller and its shaft h, a pinion i, on said controller-shaft, the shaft or rod d, and its chain c, a handle g, and an intermediate cog-wheel l, having missing teeth, said wheel serving to transmit power from the pinion j, to the pinion l, substantially as set forth.

4. The combination with the electrical controller b, having shaft h, and a pinion i, of a shaft d, having the handle g, pinion j, and brake connection c, and an intermediate cog-wheel l, having missing teeth, substantially as set forth.

5. The combination with the electrical controller b, having shaft h, a pinion i, of a shaft d, having the handle g, sliding pinion j, a brake connection c, and an intermediate cog-wheel l, having missing teeth, a lever m, adapted to throw the pinion j, out of meshing engagement with the cog-wheel l, substantially as set forth.

In testimony that I claim the foregoing I have hereunto set my hand this 7th day of June, 1900.

WALTER W. TICE.

Witnesses:
CHARLES H. PELL,
C. B. PITNEY.